United States Patent
Kuo

(10) Patent No.: US 7,715,335 B2
(45) Date of Patent: May 11, 2010

(54) METHOD AND APPARATUS FOR ACQUIRING POINT-TO-MULTIPOINT MBMS SERVICE INFORMATION IN A WIRELESS COMMUNICATIONS SYSTEM

(75) Inventor: Richard Lee-Chee Kuo, Taipei (TW)

(73) Assignee: Innovative Sonic Limited, Road Town, Tortola (VG)

( * ) Notice: Subject to any disclaimer, the term of this patent is extended or adjusted under 35 U.S.C. 154(b) by 592 days.

(21) Appl. No.: 11/717,705

(22) Filed: Mar. 14, 2007

(65) Prior Publication Data

US 2007/0218929 A1 Sep. 20, 2007

Related U.S. Application Data

(60) Provisional application No. 60/743,498, filed on Mar. 16, 2006.

(51) Int. Cl.
*H04H 20/71* (2008.01)
(52) U.S. Cl. .................. 370/312; 370/328; 370/432
(58) Field of Classification Search ................ None
See application file for complete search history.

(56) References Cited

U.S. PATENT DOCUMENTS

| | | | | |
|---|---|---|---|---|
| 2005/0047359 A1* | 3/2005 | Sebire | ........................ | 370/312 |
| 2005/0195760 A1* | 9/2005 | Lee et al. | ..................... | 370/312 |
| 2005/0249140 A1* | 11/2005 | Lee et al. | ..................... | 370/312 |
| 2006/0030342 A1* | 2/2006 | Hwang et al. | ............... | 455/466 |
| 2006/0058034 A1* | 3/2006 | Vaittinen et al. | ............ | 455/450 |
| 2006/0079242 A1* | 4/2006 | Vaittinen et al. | ............ | 455/453 |
| 2006/0094408 A1 | 5/2006 | Hu | | |
| 2006/0176838 A1* | 8/2006 | Lee et al. | ..................... | 370/312 |
| 2007/0232291 A1* | 10/2007 | Rathonyi et al. | ............ | 455/423 |

FOREIGN PATENT DOCUMENTS

| KR | 10-2005-0015544 | 2/2005 |
|---|---|---|
| KR | 1020050047439 | 5/2005 |
| KR | 100690439 | 3/2007 |

OTHER PUBLICATIONS

3GPP TS 23.246 V6.7.0, "Multimedia Broadcast/Multicast Service (MBMS); Architecture and Functional Description," (Release 6), (Jun. 2005).
3GPP TS 25.346 V6.7.0, "Introduction of the Multimedia Broadcast Multicast Service (MBMS) in the Radio Access Network (RAN)," Stage 2, (Release 6), (Dec. 2005).
3GPP TS V6.8.0, "Radio Resource Control (RRC); Protocol Specification," (Release 6), (Dec. 2005).
Alcatel Shanghai Bell, MBMS priority handling, 3GPP TSG-RAN WG RAN2 #48, Sep. 2, 2005, R2-051927.

* cited by examiner

*Primary Examiner*—Ajit Patel
(74) *Attorney, Agent, or Firm*—Winston Hsu

(57) ABSTRACT

In order to prevent a receiving terminal from wasting system resource and power, the present invention provides a method of acquiring point-to-multipoint MBMS service information for the receiving terminal in a wireless communications system. The method includes the following steps of determining an activation state of MBMS services in the receiving terminal before the receiving terminal performs an MBMS point-to-multipoint Control Channel (MCCH) acquisition procedure, and performing the MCCH acquisition procedure by the receiving terminal if at least one MBMS service has been determined activated.

8 Claims, 3 Drawing Sheets

METHOD AND APPARATUS FOR ACQUIRING POINT-TO-MULTIPOINT MBMS SERVICE INFORMATION IN A WIRELESS COMMUNICATIONS SYSTEM

CROSS REFERENCE TO RELATED APPLICATIONS

This application claims the benefit of U.S. Provisional Application No. 60/743,498, filed on Mar. 16, 2006 and entitled "Method and Apparatus to Determine Whether to Acquire the MCCH in a Wireless Communications System", the contents of which are incorporated herein by reference.

BACKGROUND OF THE INVENTION

1. Field of the Invention

The present invention relates to a method and related apparatus for acquiring information of a point-to-multipoint (p-t-m) Multimedia Broadcast Multicast Service (MBMS) service in a wireless communications system, and more particularly, to a method and related apparatus for acquiring information of a p-t-m MBMS service for a receiving terminal in a wireless communications system for saving power and resources of the receiving terminal.

2. Description of the Prior Art

The third generation (3G) mobile telecommunications system has adopted a Wideband Code Division Multiple Access (WCDMA) wireless air interface access method for a cellular network. WCDMA provides high frequency spectrum utilization, universal coverage, and high quality, high-speed multimedia data transmission. The WCDMA method also meets all kinds of QoS requirements simultaneously, providing diverse, flexible, two-way transmission services and better communication quality to reduce transmission interruption rates. To enhance multimedia functions in the 3G mobile telecommunications system, a protocol specification developed by the 3rd Generation Partnership Project (3GPP) provides Multimedia Broadcast Multicast Service (MBMS). MBMS is a point-to-multipoint bearer service and is established on an existing network architecture of the Universal Mobile Telecommunications System (UMTS), utilizing Internet Protocol (IP) packets as a medium. Thus, MBMS allows a single source entity to transmit data to multiple user entities simultaneously.

Since the 3GPP has thoroughly defined operations and architecture of MBMS in the related specifications, the operations and architecture of MBMS are described only briefly hereinafter. For the universal mobile telecommunications system (UMTS), the 3G communications system comprises User Equipment (UE), the UMTS Terrestrial Radio Access Network (UTRAN), and the Core Network (CN). Communications protocols utilized include Access Stratum (AS) and Non-Access Stratum (NAS). AS comprises various sub-layers for different functions, including Radio Resource Control (RRC), Radio Link Control (RLC), Media Access Control (MAC), Packet Data Convergence Protocol (PDCP), and Broadcast/Multicast Control (BMC). The sub-layers mentioned, and their operating principles, are well known in the art, and detailed description thereof is omitted. For MBMS, the Core Network further comprises the Broadcast Multicast Service Center (BM-SC) that is not only a newly added network node but also an entry point for receiving external data, e.g. data provided by a content provider. The BM-SC manages provision, delivery, announcement, authorization, and storage of related parameters for MBMS services, and transmits corresponding information to the Gateway GPRS Support Node (GGSN). In the MBMS system architecture, the GGSN plays a role as an entry point for IP multicast traffic, and routes MBMS data to the Serving GPRS Support Node (SGSN) via a proper GPRS Tunnel (GTP). More than one SGSN can exist under the GGSN. The SGSN performs MBMS Bearer Service control functions to accurately transmit data packets to the UTRAN, allowing multiple UEs, which order the same MBMS service in the same UTRAN, to receive the same MBMS data. The SGSN can comprise more than one Radio Network Controller (RNC). The RNCs are responsible for efficiently allocating radio resources for the UEs according to the number of UEs counted by the Node-Bs (NB). The RNC comprises more than one NB that is responsible for transmitting or receiving radio waves to or from the UEs that can be mobile phones or PDAs.

According to the protocol specification developed by the 3GPP, MBMS offers two service modes: Broadcast mode and Multicast mode. When interested in a specific MBMS service, the UE needs to order the BM-SC for the MBMS service by establishing a service agreement including specific service provision phases. These two service modes have different service provision phases. The service provision phase of Broadcast mode includes Service announcement, Session Start, MBMS notification, Data Transfer and Session Stop. The service provision phase of Multicast mode includes Subscription, Service announcement, Joining, Session Start, MBMS notification, Data Transfer, Session Stop and Leaving. For realizing customized services, Joining and Leaving sessions utilized in Multicast mode enable the BM-SC to execute authorization and payment recording for the UEs at the joining session. The service provision phases mentioned above are well known in the art, and will not be described in detail.

From the standpoint of the RRC, all logical data communication exchange channels, be they for providing data transmission exchange to the UE or for providing RRC layer control signal transmission exchange, are defined in the context of a Radio Bearer (RB). In the UE end, the RB comprises one unidirectional, or a pair of, uplink/downlink logic data transmission exchange channels. In the network end, the RB comprises one unidirectional, or a pair of, uplink/downlink logic data transmission exchange channels.

When providing the MBMS service, the UTRAN may obtain the number of the UEs ordering the MBMS service via a counting procedure, and can adopt either one of the following two transmission modes: point-to-point (p-t-p) transmission and point-to-multipoint (p-t-m) transmission. In the p-t-p transmission, transmission between the UEs and the UTRAN utilizes a dedicated-channel, and thereby the Node-B establishes one dedicated channel for one UE to transmit data and configuration. Compared with the p-t-p transmission, the p-t-m transmission allows the CN to provide the data and the configuration for multiple UEs in the same cell simultaneously. In addition, when the MBMS service is in Broadcast mode, only the p-t-m transmission is used. When the MBMS service is in Multicast mode, the UTRAN switches between the p-t-p and p-t-m transmissions according to the number of UEs. In the protocol specification developed by the 3GPP, three logical channels are defined to transmit corresponding MBMS information: MBMS point-to-multipoint Control Channel (MCCH), MBMS point-to-multipoint Traffic Channel (MTCH), and MBMS point-to-multipoint Scheduling Channel (MSCH). The three logical channels are mapped onto a transport channel, Forward Access Channel (FACH), and the FACH is mapped onto a physical channel, Secondary Common Control Physical Channel (S-CCPCH). MCCH is utilized to transmit a corresponding MBMS configuration, including MBMS Radio Bearer Information, MBMS Service Information, and other information. In general, before obtaining the MBMS configuration, the UE first has to receive System Information block type 5 or 5bis through S-CCPCH, and detect whether an MCCH configuration carrying the above-mentioned information is included in the System Information block type 5 or 5bis.

In order for the UE to understand the current status of each MBMS service, the protocol specification of 3GPP TS 25.331 V6.8.0 RRC Release 6 defines a variable, MBMS_ACTIVATED_SERVICES, used for storing information of the MBMS Multicast services the UE has joined, as well as the MBMS Broadcast services the UE is interested in receiving. The stored information in the MBMS_ACTIVATED_SERVICES variable includes Activated service list, Service type, etc. The content of the variable, or the stored information, is updated by the UE as the MBMS service status changes, e.g. when the UE joins or leaves a Multicast service. Additionally, the RRC protocol specification further defines several situations in which the UE is required to perform an MCCH acquisition procedure requesting the base station to transmit MBMS service information and configuration to the UEs. The MBMS service information and configuration includes information related to radio bearers, settings, and preferred frequency of the MBMS services, such as MBMS Modified Services Information and MBMS Common P-T-M RB Information. The UE can determine the current status of the MBMS services provided in the cell based on the above-mentioned information, and thereby can activate the service reception, or modify the corresponding settings. According to subclause 8.7.2 of the 3GPP protocol specification TS 25.331 V6.8.0 RRC, the situations in which the UE is required to perform the MCCH acquisition procedure include:

1. Upon selecting or re-selecting a cell supporting MBMS services, such as during a power-on period of the UE.
2. Upon change of a cell controlling the MBMS service being received by the UE due to an active set update or hard-handover.
3. Upon entering the UTRAN from another radio access technology (RAT), such as Global System for Mobile Communication (GSM).
4. Upon releasing an MBMS point-to-point radio bearer, such as when transiting from p-t-p transmission to p-t-m transmission in an MBMS service.
5. Upon returning from loss of coverage, such as transiting out of a basement or an elevator, to effective receiving coverage.
6. Upon receiving an indication from upper layers that the MBMS activated service has changed, such as when a new MBMS service item is added into the service set.

According to the protocol specification, the UE applies the MCCH acquisition procedure to determine MBMS services available in the cell and to initiate reception of the MBMS services that the UE has joined. Additionally, the MCCH acquisition procedure is applied to the all UEs supporting MBMS, irrespective of an RRC state of the UEs, such as idle, URA_PCH, CELL_PCH, CELL_FACH and CELL_DCH state. The above-mentioned RRC states are well known in the ordinary art and the details thereof are omitted. Therefore, in the prior art, the UEs not using MBMS service functions or not interested in the current MBMS services still apply the MCCH acquisition procedure, thereby resulting in system resource waste and power consumption.

SUMMARY OF THE INVENTION

It is therefore a primary object of the present invention to provide a method and related apparatus for acquiring information of a point-to-multipoint (p-t-m) Multimedia Broadcast Multicast Service (MBMS) service for a receiving terminal in a wireless communications system for saving power and resources of the receiving terminal.

The present invention discloses a method of acquiring information of a point-to-multipoint (p-t-m) Multimedia Broadcast Multicast Service (MBMS) service for a receiving terminal in a wireless communications system. The method includes the following steps of determining an activation state of p-t-m MBMS services in the receiving terminal before the receiving terminal executes an MBMS Control Channel (MCCH) acquisition procedure, and executing the MCCH acquisition procedure when at least one p-t-m MBMS service is confirmed activated in the receiving terminal.

The present invention further discloses a communications device for providing timely acquisition of information of a point-to-multipoint (p-t-m) Multimedia Broadcast Multicast Service (MBMS) service in a wireless communications system. The communications device comprises a control circuit, a processor and a memory. The control circuit is used for realizing functions of the receiving device. The processor is installed in the control circuit and used for executing a program code to operate the control circuit. The memory is coupled to the processor for storing the program code. The program code comprises: determining an activation state of p-t-m MBMS services in the communications device before the communications device executes an MBMS Control Channel (MCCH) acquisition procedure, and executing the MCCH acquisition procedure when at least one p-t-m MBMS service is confirmed activated in the communications device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
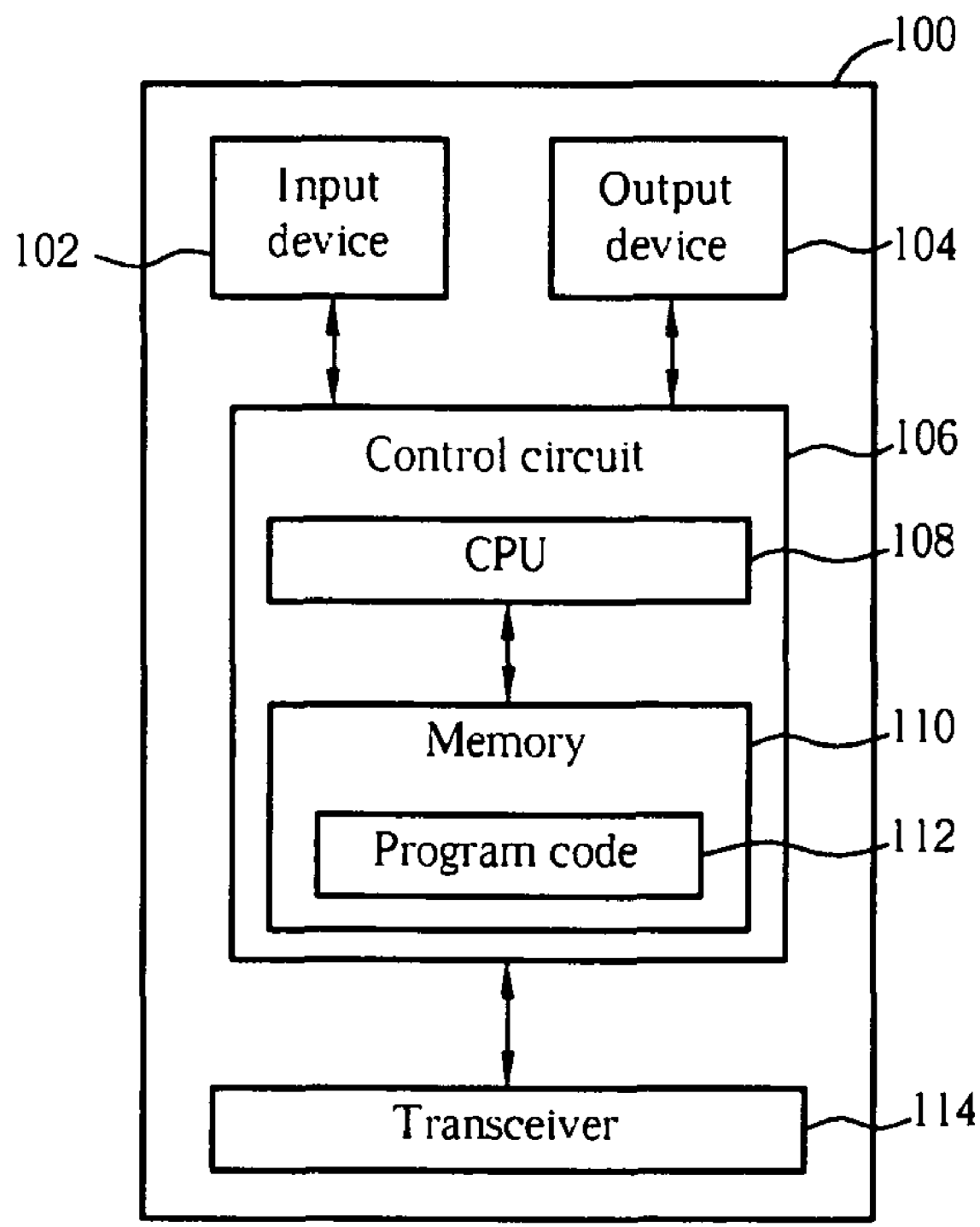
FIG. 1 is a functional block diagram of a communications device.

Please refer to FIG. 1, which is a functional block diagram of a communications device 100. For the sake of brevity, FIG. 1 only shows an input device 102, an output device 104, a control circuit 106, a central processing unit (CPU) 108, a memory 110, a program code 112, and a transceiver 114 of the communications device 100. In the communications device 100, the control circuit 106 executes the program code 112 in the memory 110 through the CPU 108, thereby controlling an operation of the communications device 100. The communications device 100 can receive signals input by a user through the input device 102, such as a keyboard, and can output images and sounds through the output device 104, such as a monitor or speakers. The transceiver 114 is used to receive and transmit wireless signals, delivering received signals to the control circuit 106, and outputting signals generated by the control circuit 106 wirelessly. From a perspective of a communications protocol framework, the transceiver 114 can be seen as a portion of Layer 1, and the control circuit 106 can be utilized to realize functions of Layer 2 and Layer 3.

Figure 2:
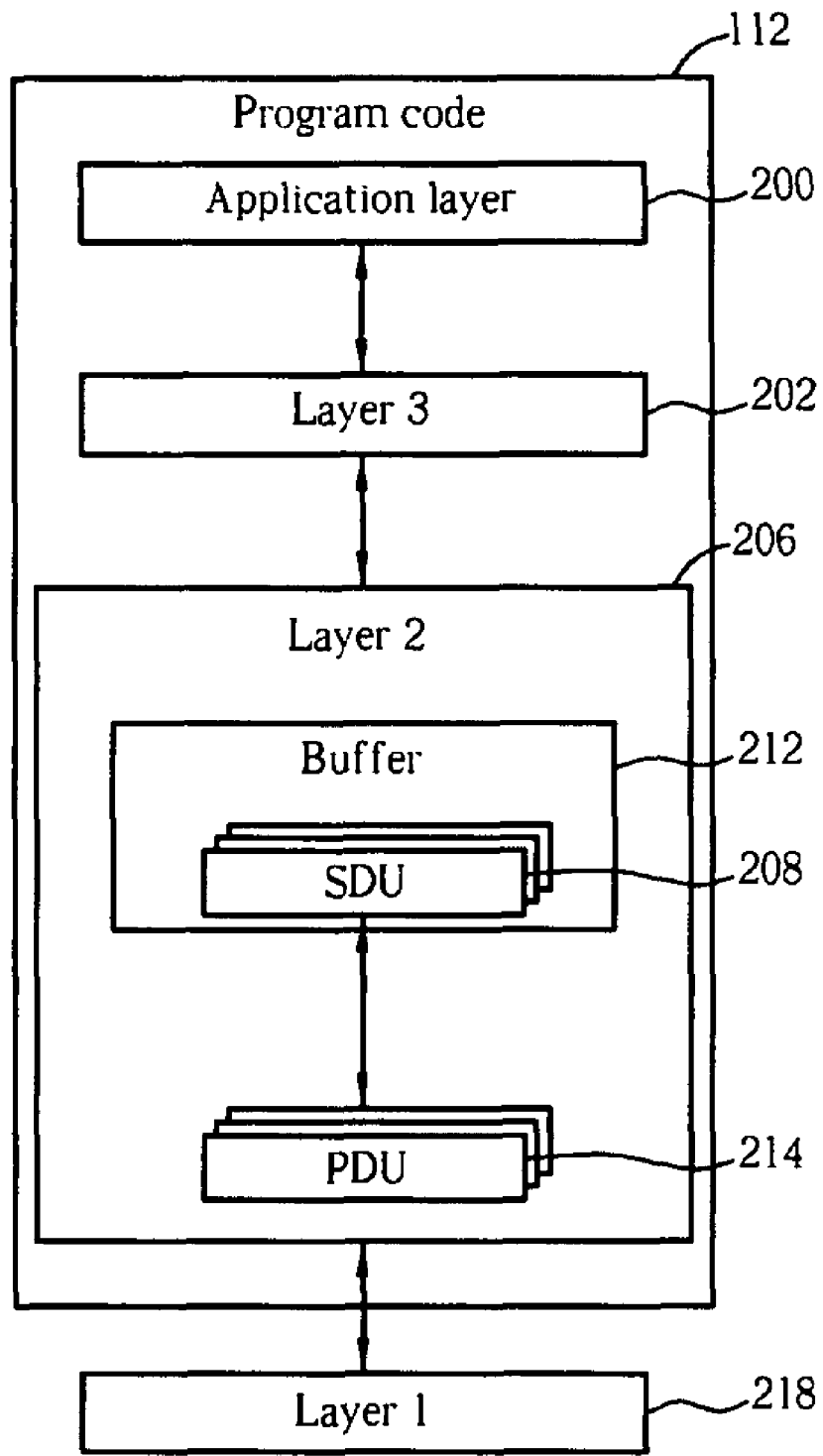
FIG. 2 is a diagram of program code in FIG. 1.

Please continue to refer to FIG. 2. FIG. 2 is a diagram of the program code 112 shown in FIG. 1. The program code 112 includes an application layer 200, a Layer 3 202, and a Layer 2 206, and is coupled to a Layer 1 218. When signals are transmitted, the Layer 2 206 generates multiple serving data units (SDUs) 208 in a buffer 212 based on the data output by the Layer 3 202. The Layer 2 206 generates multiple protocol data units (PDUs) 214 according to the SDUs 208 and further outputs the PDUs 214 to Layer 1 218 for transmission. On the contrary, when wireless signals are received, the Layer 1 218 is used for receiving the wireless signals, and the received wireless signals are outputted in a format of the PDUs 214 to the Layer 2 206. The Layer 2 206 recovers the PDUs 214 to the SDUs 208 stored in the buffer 212. Finally, the Layer 2 206 transfers the SDUs 208 to the Layer 3 202.

Preferably, the communications device 100 is adopted in the 3G mobile telecommunications system, and used for receiving point-to-multipoint (p-t-m) Multimedia Broadcast Multicast Service (MBMS) services and corresponding information thereof. The embodiment of the present invention configures corresponding algorithms in the program code 112 to accurately acquire the p-t-m MBMS service to prevent a waste of system resources and power consumption in the communications device 100.

Figure 3:
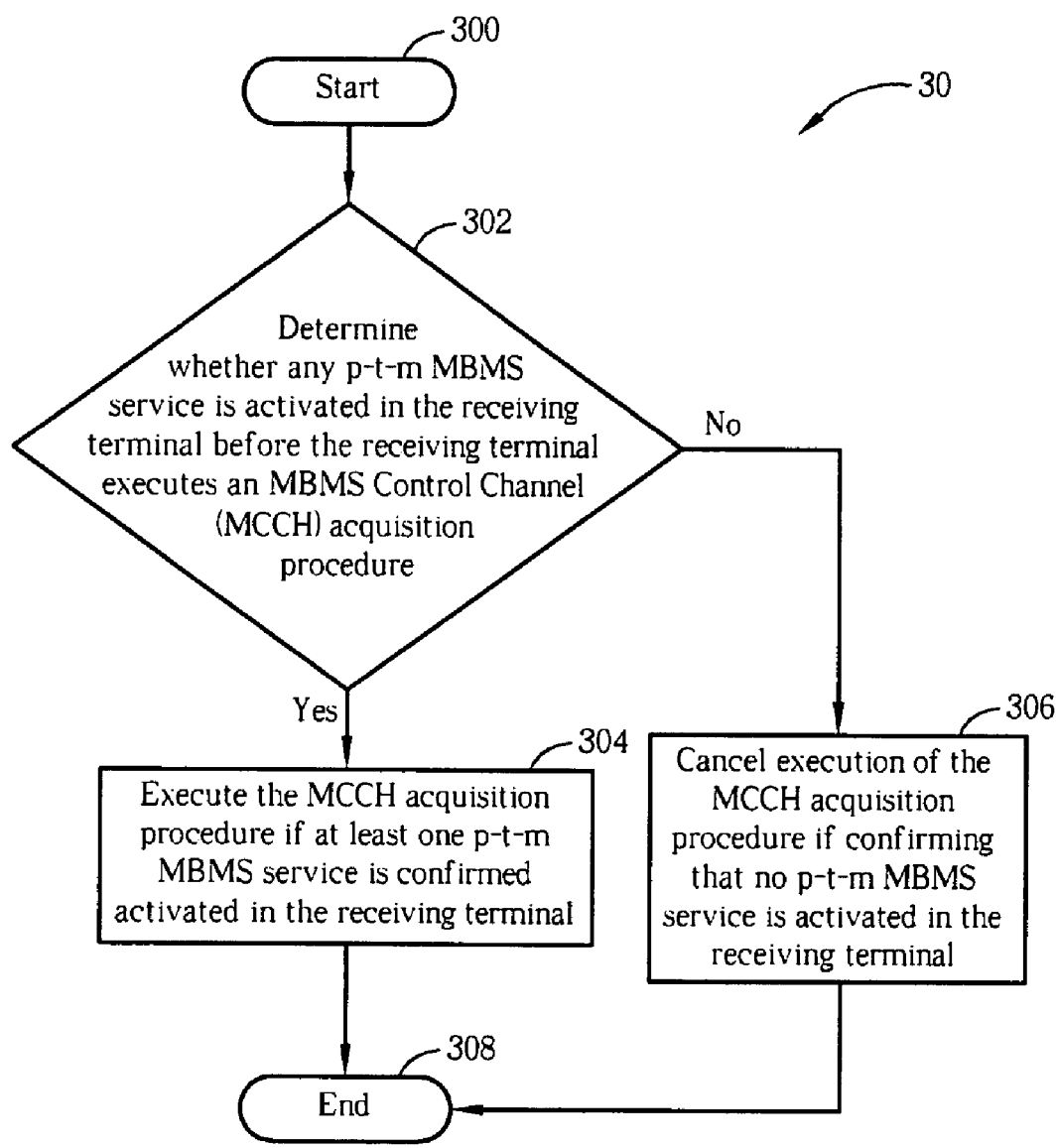
FIG. 3 is a flow chart of a method according to an embodiment of the present invention.

Please refer to FIG. 3, which is a flowchart of a process 30 according to an embodiment of the present invention. The process 30 is utilized to stop a point-to-multipoint (p-t-m) Multimedia Broadcast Multicast Service (MBMS) service utilized in a receiving terminal of a wireless communications system. The process 30 includes the following steps:

Step 300: Start.

Step 302: Determine whether any p-t-m MBMS service is activated in the receiving terminal before the receiving terminal executes an MBMS Control Channel (MCCH) acquisition procedure. If so, go to Step 304; else, go to Step 306.

Step 304: Execute the MCCH acquisition procedure if at least one p-t-m MBMS service is confirmed activated in the receiving terminal, and then go to Step 308.

Step 306: Cancel execution of the MCCH acquisition procedure if confirming that no p-t-m MBMS service is activated in the receiving terminal.

Step 308: End.

According to the process 30, the receiving terminal first determines whether any p-t-m MBMS service is activated before executing an MCCH acquisition procedure. If at least one p-t-m MBMS service is confirmed activated in the receiving terminal, the receiving terminal executes the MCCH acquisition procedure. On the contrary, if a determined result reveals that no p-t-m MBMS service is activated, the receiving terminal cancels execution of the MCCH acquisition procedure. Thus, for the receiving terminal that has no p-t-m MBMS service in use, the process 30 can prevent the receiving terminal from unnecessarily executing the MCCH acquisition procedure, which prevents system resource waste and power consumption in the receiving terminal. In the third generation telecommunications system, a user equipment can activate a p-t-m MBMS service through an MBMS Broadcast/Multicast Service Activation procedure, and information of the p-t-m MBMS service, such as service name and type, is then stored in MBMS_ACTIVATED_SERVICES variable when the activation of the p-t-m MBMS service completes.

Additionally, according to the 3GPP TS 25.331 V6.8.0 RRC specification, the user equipment is required to execute the MCCH acquisition procedure in the above-mentioned six situations. In the embodiment of the present invention, the user equipment (seen as a receiving terminal) reads the MBMS_ACTIVATED_SERVICES variable to determine whether any p-t-m MBMS service is activated in advance of execution of the MCCH acquisition procedure triggered by the six situations, and executes the MCCH acquisition procedure only if at least one p-t-m MBMS service is confirmed activated.

For example, the communications device 100 shown in FIG. 1 can be the user equipment. The UTRAN serves as a transmitting terminal and cooperates with the Core Network to provide p-t-m MBMS services for the receiving terminal. Suppose two user equipments UE1 and UE2 support p-t-m MBMS and are located inside service coverage. Consider a scenario wherein the user equipments UE1 and UE2 move out of the service coverage and then return back, such as taking an elevator between a basement and ground-up floors. That is, the user equipments UE1 and UE2 conform to the fifth term of the above-mentioned six situations: returning from loss of coverage. Further, assume that only the user equipment UE2 activates a p-t-m MBMS service before moving out of the service coverage, while the user equipment UE1 does not use any MBMS service functions. In other words, the user equipment UE2 performs the MBMS Multicast Service Activation procedure, and stores information of the p-t-m MBMS service, e.g. service name, in the MBMS_ACTIVATED_SERVICES variable. According to the process 30, since the user equipment UE2 activates the p-t-m MBMS service beforehand, the user equipment UE2 has to execute the MCCH acquisition procedure for service information, such as MBMS Modified Services Information, MBMS Common P-T-M RB Information, etc., when the user equipments UE1 and UE2 return to the service coverage. On the contrary, as the user equipment UE1 has not activated any MBMS services, the user equipment UE1 does not execute the MCCH acquisition procedure. In this situation, the user equipment UE1 will not waste power and system resources executing the MCCH acquisition procedure under the condition that no p-t-m MBMS service is activated in the user equipment UE1. Please note that MBMS Broadcast/Multicast Service Activation procedure can be found in 3GPP TS 23.246 V6.7.0 MBMS Architecture and functional description, whereas detailed operations of the MCCH acquisition procedure can be found in subclause 8.7.2 of 3GPP TS 25.331 V6.8.0 RRC specification.

In summary, according to the prior art, any user equipment supporting MBMS, irrespective of its RRC state, is required to execute the MCCH acquisition procedure in the above-mentioned situations. This results in system resource waste in a receiving terminal that does not use or is not interested in p-t-m MBMS services. In the embodiment of the present invention, the receiving terminal has to determine an activation state of the p-t-m MBMS services, which indicates whether any p-t-m MBMS service is activated before executing the MCCH acquisition procedure. The MCCH acquisition procedure is executed only if at least one p-t-m MBMS service is confirmed activated in the receiving terminal. Thus, the receiving terminals which are not interested in, or do not use, p-t-m MBMS services will not waste power and resources because of unnecessary execution of the MCCH acquisition procedure. Therefore, the embodiment of the present invention can prevent power consumption and resource waste in the receiving terminal.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of acquiring information of a point-to-multipoint (p-t-m) Multimedia Broadcast Multicast Service (MBMS) service for a receiving terminal in a wireless communications system, the method comprising:

determining an activation state of p-t-m MBMS services which indicates whether any p-t-m MBMS service is activated in the receiving terminal before the receiving terminal executes an MBMS Control Channel (MCCH) acquisition procedure; and executing the MCCH acquisition procedure if at least one p-t-m MBMS service is confirmed activated in the receiving terminal.

2. The method of claim 1, wherein confirming that at least one p-t-m MBMS service is activated in the receiving terminal is confirming that information of at least one p-t-m MBMS service is stored in MBMS_ACTIVATED_SERVICES variable in the receiving terminal.

3. The method of claim 1, wherein confirming that at least one p-t-m MBMS service is activated in the receiving terminal is confirming that an MBMS Broadcast/Multicast Service Activation has been executed in the receiving terminal.

4. The method of claim 1, wherein the wireless communications system is a third generation telecommunications system.

5. A communications device for providing timely acquisition of information of a point-to-multipoint (p-t-m) Multimedia Broadcast Multicast Service (MBMS) service in a wireless communications system, the communications device comprising:

a control circuit for realizing functions of the communications device;

a processor installed in the control circuit, for executing a program code to operate the control circuit; and a memory coupled to the processor for storing the program code;

wherein the program code comprises:

determining an activation state of p-t-m MBMS services which indicates whether any p-t-m MBMS service is activated in the communications device before the communications device executes an MBMS Control Channel (MCCH) acquisition procedure; and executing the MCCH acquisition procedure if at least one p-t-m MBMS service is confirmed activated in the communications device.

6. The communications device of claim 5, wherein confirming that at least one p-t-m MBMS service is activated in the communications device is confirming that information of at least one p-t-m MBMS service is stored in MBMS_ACTIVATED_SERVICES variable in the communications device.

7. The communications device of claim 5, wherein confirming that at least one p-t-m MBMS service is activated in the communications device is confirming that an MBMS Broadcast/Multicast Service Activation has been executed in the communications device.

8. The communications device of claim 5, wherein the wireless communications system is a third generation telecommunications system.

* * * * *